(No Model.)

E. T. STARR.
SECONDARY BATTERY.

No. 282,396. Patented July 31, 1883.

WITNESSES
Wm A. Skinkle
F. D. Shoemaker

INVENTOR,
Eli T. Starr,
By his Attorneys
Baldwin, Hopkins & Peyton

UNITED STATES PATENT OFFICE.

ELI T. STARR, OF PHILADELPHIA, PENNSYLVANIA, ASSIGNOR OF ONE-HALF TO WILLIAM J. PEYTON, OF WASHINGTON, DISTRICT OF COLUMBIA, AND H. M. LEWIS AND JAMES W. WHITE, OF PHILADELPHIA, PENNSYLVANIA.

SECONDARY BATTERY.

SPECIFICATION forming part of Letters Patent No. 282,396, dated July 31, 1883.

Application filed November 28, 1882. (No model.)

*To all whom it may concern:*

Be it known that I, ELI T. STARR, of the city and county of Philadelphia, in the State of Pennsylvania, have invented certain new and useful Improvements in Secondary Batteries, of which the following is a specification.

My invention relates more especially to electric batteries of that class which generate no electricity of themselves, but which, when submitted to the action of an electric current from a suitable generator passing through the battery, become charged or put into condition to give off electric currents or energy upon connecting the poles of the battery by a conductor.

The object of my invention is more particularly to improve secondary-battery elements by constructing them in a more economical and substantial manner, while producing elements capable of large storage capacity within comparatively small space. To these ends I construct the elements or electrodes of secondary batteries of a composition of matter molded or united into a porous self-sustaining mass.

The subject-matter claimed herein as my invention is first specifically described in detail, and then particularly pointed out at the close of the specification.

Figure 1:
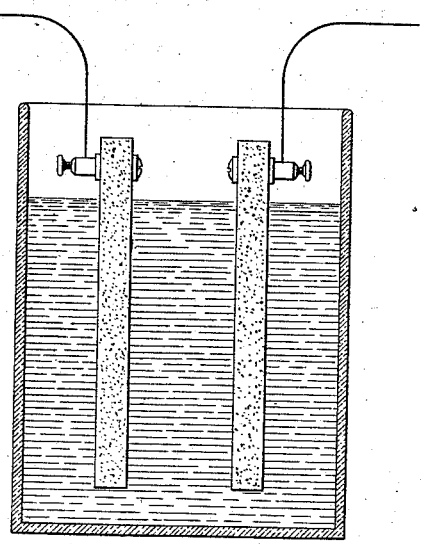
Figure 2:
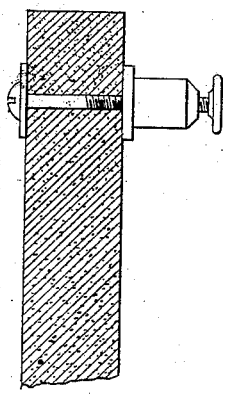

In the accompanying drawings, Figure 1 is a view in section of a secondary battery embodying elements or electrodes constructed according to my invention; and Fig. 2 is a section through one of such elements, showing one way of connecting the elements of the battery with the wires of the charging or working circuits thereof.

Heretofore the electrodes of secondary batteries have been constructed in various ways. The electrodes of the Planté type of battery consist of metal plates with their surfaces "formed" or rendered porous by electrochemical action, so as to be capable of readily accumulating the energy of the charging-current. In the Percival type of battery the electrodes are composed of a mass of porous material supported by the sides of the battery-vessel, and divided by a partition or diaphragm, while in the Faure type of battery the electrodes consist of metal plates or supports, to which are applied layers of porous active material—such, for instance, as oxide of lead. The Faure type of secondary battery is very efficacious, by reason of the employment of the oxide or finely-divided lead.

As above stated, my invention consists in electrodes or elements of secondary batteries composed of a composition of matter formed or shaped into a self-sustaining porous mass, whereby the use of plates or the sides of the battery-vessel as supports for the porous layer or material, as heretofore employed, is avoided, while the advantages and benefits of the porous active material are retained.

In carrying out my invention various compositions may be used to form the electrodes, and the shape they may be made to assume may also be varied.

A secondary-battery element or electrode embodying my invention may be constructed as follows: Take granulated or finely-divided lead and thoroughly mix it with oxide or peroxide of lead, and with a suitable quantity of mercury to convert the mass into a plastic one. The mass composed of the finely-divided lead and oxide or peroxide of lead and mercury is then placed in a mold and subjected to pressure, so as to express from the mass any excess of mercury. In a short time the composition becomes amalgamated into a hard self-sustaining but porous body. The proportions of the amalgam electrode may be in the ratio of two ounces of lead filings to two and one-half ounces of oxide of lead, mixed with a sufficient quantity of mercury to convert the mass into a plastic one; but the proportions may of course be varied, and other ingredients may be added—such, for instance, as a small quantity of silver—to insure better effects or better amalgam, if desired.

The above is one way by which a composition of matter embodying finely-divided lead or oxide of lead as a constituent may be formed into a porous self-sustaining electrode for secondary batteries by amalgamation with mercury, the electrode being capable of accumulating a large amount of energy from a charging-current. I prefer the elements to be in the form of flat plates; but, as before stated, the elements may have different shapes.

In order to afford a ready means of connecting the circuit connections or wires, whether of the charging or working circuit of the battery, with the porous composition electrodes, when assembled in the battery-vessel and immersed, for instance, in dilute sulphuric acid, I preferably drill a hole into the upper end of the porous body and fasten the wires by means of a binding-screw fitted into said hole, as clearly shown in Fig. 2. It will be obvious, however, that the shape of the electrodes may be such as to afford ready means of connecting the wires either with or without binding screws or bolts, and that the connections may be made in various well-known ways.

This application is a division of my application filed July 24, 1882, in favor of which I hereby disclaim any and all patentable subject-matter of my invention, save that specifically recited in the following claims.

I claim herein as of my invention—

1. An amalgam electrode for electric batteries, consisting of an agglomerate mixture of finely-divided active matter with mercury, substantially as described.

2. An agglomerated amalgam electrode for electric batteries, having a metallic oxide as a constituent of the electrode, substantially as described.

3. An element or electrode for a secondary battery, composed of an amalgam of lead and mercury and any substance capable of being acted upon in said battery to store electrical potential, substantially as described.

In testimony whereof I have hereunto subscribed my name this 30th day of September, A. D. 1882.

ELI T. STARR.

Witnesses:
 WM. J. PEYTON,
 JOHN URIAN.